(12) United States Patent
Hwang et al.

(10) Patent No.: US 12,713,118 B2
(45) Date of Patent: Aug. 18, 2026

(54) LENS MODULE AND CAMERA MODULE INCLUDING SAME

(71) Applicant: SAMSUNG ELECTRO-MECHANICS CO., LTD., Suwon-si (KR)

(72) Inventors: Se Yeon Hwang, Suwon-si (KR); Seok Hwan Kim, Suwon-si (KR); Seung Jae Song, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 627 days.

(21) Appl. No.: 17/851,507

(22) Filed: Jun. 28, 2022

(65) Prior Publication Data

US 2023/0075967 A1 Mar. 9, 2023

(30) Foreign Application Priority Data

Sep. 7, 2021 (KR) ........................ 10-2021-0119205

(51) Int. Cl.

| | |
|---|---|
| ***G02B 7/02*** | (2021.01) |
| ***G02B 7/09*** | (2021.01) |
| ***H04N 23/55*** | (2023.01) |

(52) U.S. Cl.

CPC ............. *H04N 23/55* (2023.01); *G02B 7/021* (2013.01); *G02B 7/09* (2013.01)

(58) Field of Classification Search

CPC ........ H04N 23/55; H04N 23/58; G02B 7/021; G02B 7/09; G02B 13/0045; G03B 5/04; G03B 17/12; G03B 30/00; G03B 2205/0023; G03B 2205/0069; H02K 41/0356

See application file for complete search history.

(56) References Cited

U.S. PATENT DOCUMENTS

| | | | | |
|---|---|---|---|---|
| 6,553,185 | B1 | 4/2003 | Inaba et al. | |
| 2007/0183764 | A1* | 8/2007 | Imura .................... | H04N 23/55 348/E5.046 |
| 2008/0256946 | A1* | 10/2008 | Wakahara ................. | F03G 7/06 29/857 |

(Continued)

FOREIGN PATENT DOCUMENTS

| | | | |
|---|---|---|---|
| CN | 106054494 | A | 10/2016 |
| CN | 110095853 | A | 8/2019 |

(Continued)

OTHER PUBLICATIONS

Korean Office Action issued on Mar. 19, 2023, in counterpart Korean Patent Application No. 10-2021-0119205 (5 pages in English, 4 pages in Korean).

(Continued)

*Primary Examiner* — Bumsuk Won
*Assistant Examiner* — John C Sipes
(74) *Attorney, Agent, or Firm* — NSIP Law

(57) ABSTRACT

A lens module is provided. The lens module includes a first driving unit configured to move a first lens barrel along an optical axis direction; and a second driving unit configured to move a second lens barrel along the optical axis direction, wherein the second driving unit is disposed between the first lens barrel and the second lens barrel and is configured to change a distance between the first lens barrel and the second lens barrel.

19 Claims, 7 Drawing Sheets

(56) References Cited

U.S. PATENT DOCUMENTS

2009/0128931 A1* 5/2009 Matsumoto ............ G02B 7/102 359/823
2010/0141830 A1* 6/2010 Zhang ................ H04N 1/19594 348/374
2011/0169918 A1* 7/2011 Yoo ...................... H04N 13/296 348/46
2013/0148954 A1* 6/2013 Uehara .................. G03B 17/14 396/532
2016/0299349 A1 10/2016 Cho
2019/0137726 A1* 5/2019 Suzuki ..................... G02B 7/10
2019/0235199 A1 8/2019 Fujiwara
2020/0028999 A1 1/2020 Jun
2022/0011556 A1* 1/2022 Matikainen ............ H04N 23/55
2023/0296962 A1* 9/2023 Lee ........................ G03B 17/17 359/557
2023/0350276 A1* 11/2023 Lee ...................... G02B 7/1828
2024/0152031 A1* 5/2024 Shibazaki ................ G03B 5/06
2024/0388783 A1* 11/2024 Kim ....................... G03B 17/12

FOREIGN PATENT DOCUMENTS

CN 110737149 A 1/2020
JP 3414040 B2 6/2003
JP 2019-133009 A 8/2019
KR 10-2020-0006607 A 1/2020
KR 10-2020-0009868 A 1/2020
KR 10-2020-0142876 A 12/2020

OTHER PUBLICATIONS

Chinese Office Action issued on Jun. 13, 2025, in counterpart Chinese Patent Application No. 202211004950.2 (5 pages in English, 7 pages in Chinese).

* cited by examiner

LENS MODULE AND CAMERA MODULE INCLUDING SAME

CROSS-REFERENCE TO RELATED APPLICATION

This application claims the benefit under 35 USC § 119(a) of Korean Patent Application No. 10-2021-0119205 filed on Sep. 7, 2021, in the Korean Intellectual Property Office, the entire disclosure of which is incorporated herein by reference for all purposes.

BACKGROUND

1. Field

The following description relates to a lens module and a camera module including the same.

2. Description of Related Art

Cameras have been implemented in mobile electronic devices such as, but not limited to, smartphones, tablet personal computers (PCs), and notebook computers, and cameras that are implemented in mobile terminals may include, as examples, an autofocus function (AF), an optical image stabilization (OIS) function and a zoom function (zoom).

However, in order to implement such functions, the structure of the camera module has become complicated, and a size of the camera module has increased, such that the size of a mobile electronic device on which a camera module is mounted has increased.

Additionally, when a lens or an image sensor is directly moved to perform OIS, both a weight of the lens or image sensor and a weight of other members to which the lens or image sensor is attached may need to be considered, such that driving force above a certain level may be necessary, which may increase power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a lens module includes a first driving unit configured to move a first lens barrel along an optical axis direction; and a second driving unit configured to move a second lens barrel along the optical axis direction, wherein the second driving unit is disposed between the first lens barrel and the second lens barrel, and is configured to change a distance between the first lens barrel and the second lens barrel.

The second driving unit may include a variable member which has a first end coupled to the first lens barrel and a second end coupled to the second lens barrel, and having a length which changes based on an application of a current; and a connection board configured to apply the current to the variable member.

The variable member may include a linear actuator of which a length in the optical axis direction changes based on the application of the current.

The first end of the variable member may be bonded to the first lens barrel, and the second end of the variable member may be inserted into an insertion groove disposed in the second lens barrel.

The variable member may be coupled to a surface of the first lens barrel that opposes the second lens barrel.

The variable member may include an extension portion that protrudes from the second end of the variable member that is inserted into the insertion groove, and the extension portion may be configured to protrude in a direction perpendicular to a length direction of the variable member.

The insertion groove may be configured to have a depth that is disposed in a direction perpendicular to a moving direction of the second lens barrel.

The first driving unit may be configured to move the first lens barrel based on an operation of a voice coil motor that implements a coil and a magnet.

The second lens barrel may be configured to move with the first lens barrel when the first lens barrel is moved by the first driving unit.

The variable member may include a shape memory alloy of which a length is changed based on the application of the current.

The lens module may include a housing including the first lens barrel and the second lens barrel accommodated therein, wherein the connection board may include a flexible circuit board, and wherein a position of a first end of the connection board may be fixed with respect to the housing, and a position of a second end of the connection board is fixed with respect to the first lens barrel.

In a general aspect, a camera module includes a reflection module configured to change a traveling direction of incident light; a lens module to which light emitted from the reflection module is incident; wherein the lens module includes: a first lens barrel configured to move along an optical axis direction; a second lens barrel configured to oppose the first lens barrel and to move along the optical axis direction; and a variable member configured to have a first end fastened to the first lens barrel and a second end fastened to the second lens barrel, wherein a distance between the first end of the variable member and the second end of the variable member changes based on an application of a current.

The variable member may include a linear actuator of which a length in the optical axis direction changes based on the application of the current.

The variable member may include a shape memory alloy of which a length is changed based on the application of the current.

The camera module may include a connection board, connected to the variable member, and configured to apply the current to the variable member.

The first lens barrel may include a receiving groove in which the connection board is partially accommodated.

In a general aspect, a camera module includes a first lens barrel, configured to move in an optical axis direction based on a first driving unit; a second lens barrel, configured to move in the optical axis direction based on a second driving unit; a third lens barrel; and a linear actuator, including a first end coupled to the first lens barrel, and a second end coupled to the second lens barrel; wherein a length of the linear actuator is configured to change based on a received signal.

The linear actuator may include a shape memory alloy.

The linear actuator may be inserted into, and coupled to, the second lens barrel.

The second drive unit may include the linear actuator and a connection board which electrically connects the linear actuator to a main board.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
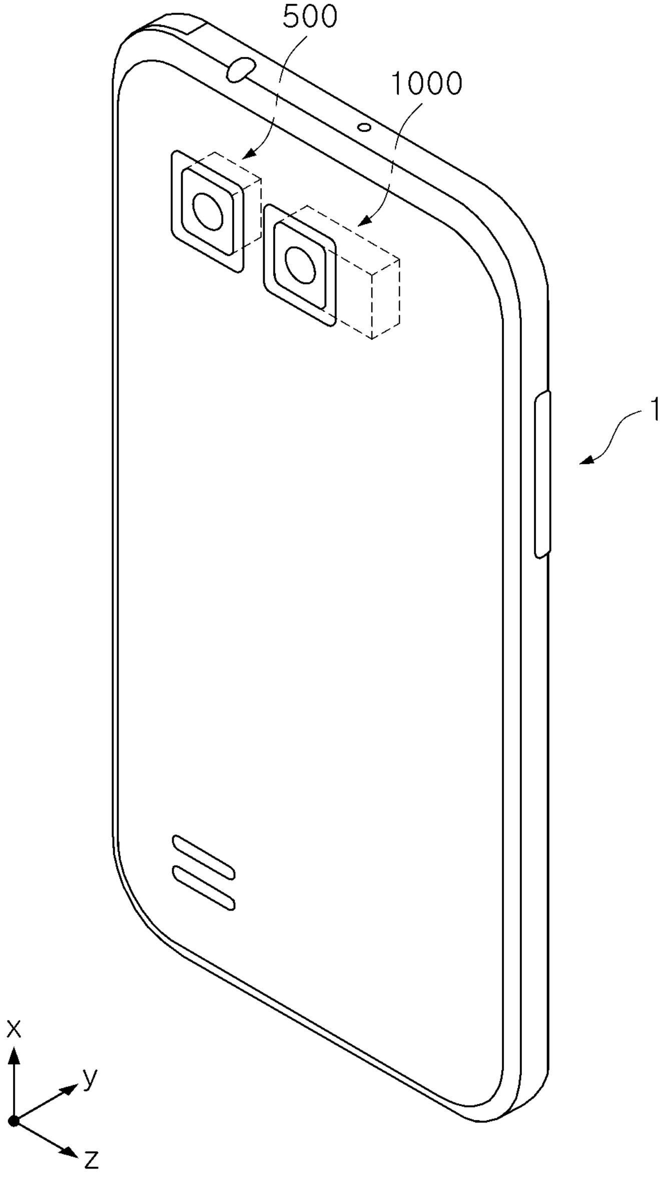
FIG. 1 illustrates a perspective diagram of an example mobile electronic device, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a perspective diagram illustrating an example mobile electronic device, in accordance with one or more embodiments.

Referring to FIG. 1, an example mobile electronic device 1, in accordance with one or more embodiments may be implemented as a portable electronic device such as, but not limited to, a mobile communication terminal, a smartphone, and a tablet PC equipped with a plurality of camera modules 500 and 1000.

In the example, a plurality of camera modules 500 and 1000 may be mounted on the mobile electronic device 1. The plurality of camera modules 500 and 1000 may be arranged to be aligned left and right as illustrated, or may be arranged to be vertically aligned, although not illustrated. Although two camera modules 500 and 100 are illustrated, this is only an example, and the number of camera modules may be more than, or less than two.

Alternatively, the mobile electronic device 1 in the example may include only the camera module 1000 having a zoom function described in the example.

At least one camera module among the plurality of camera modules 500 and 1000 may be configured as a camera module 1000 in an example. That is, a mobile electronic device having a dual camera module may include at least one of the two camera modules as the camera module 1000 in an example.

In an example, the camera module and the mobile electronic device including the camera module may implement functions such as, but not limited to, an autofocus function, a zoom function, and an optical image stabilization function, and may have a simple structure and a reduced size. Additionally, power consumption may be reduced.

In an example, the camera module 1000 may include a plurality of lenses, and an optical axis (Z-axis) of the lenses may be directed in a direction perpendicular to the thickness direction (Y-axis direction, a direction from a front surface to a rear surface of the mobile electronic device or an opposite direction thereto).

In an example, the optical axis (Z axis) of the plurality of lenses provided in the camera module 1000 may be formed in a width direction or a length direction of the mobile electronic device 1.

Accordingly, even when the camera module 1000 includes functions such as autofocusing (hereinafter, AF), zooming (Zoom) and optical image stabilization (hereinafter, OIS) of the mobile electronic device 1, the thickness of the mobile electronic device 1 may not increase. Accordingly, the thickness of the mobile electronic device 1 may be reduced.

When two camera modules are implemented, an entrance hole through which light is incident to the two camera modules may be disposed adjacent to each other.

In an example, the first camera module 1000 and the second camera module 500 may be configured to have different fields of view.

The first camera module 1000 may have a relatively narrow field of view (e.g., a telephoto camera), and the second camera module 500 may have a relatively wide field of view (e.g., a wide-angle camera). In an example, the first camera module 1000 may correspond to a camera module described below with reference to the drawings other than FIG. 2.

In an example, the field of view of the first camera module 1000 may be formed in the range of 9°-35°, and the field of view of the second camera module 500 may be formed in the range of 60°-120°.

Accordingly, by configuring the fields of view of the two camera modules to be different, images of a subject may be captured at various depths, and various images implementations such as mutually combining or overlapping images may be performed.

In a non-limited example, the camera module 1000 may have AF, Zoom and OIS functions. Specifically, in the camera module 1000 in the example, movement of the plurality of lens barrels may be implemented to be long stroke in the optical axis direction, such that a high-performance zoom function may be implemented.

Since the camera module 1000 having AF, Zoom and OIS functions, or the like, may include various components, the size of the camera module may increase as compared to a typical camera module.

Figure 2:
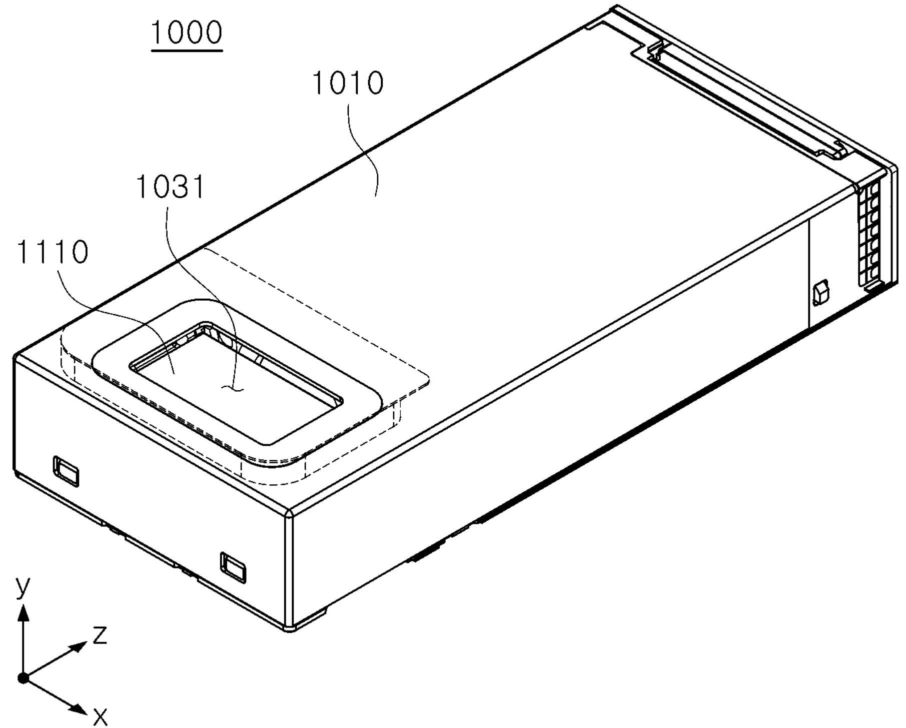
FIG. 2 illustrates a perspective diagram of an example camera module, in accordance with one or more embodiments.
Figure 3:
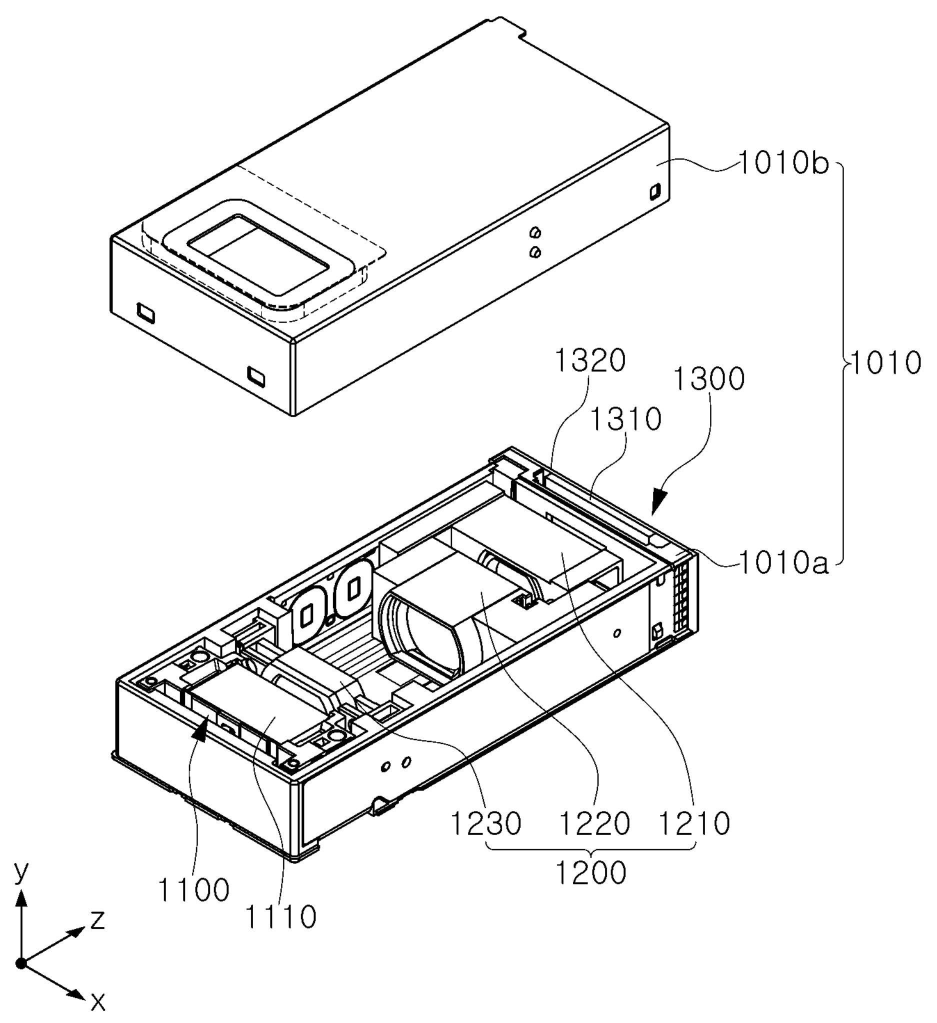
FIG. 3 illustrates an exploded perspective diagram of a portion of the example camera module illustrated in FIG. 2.
Figure 4:
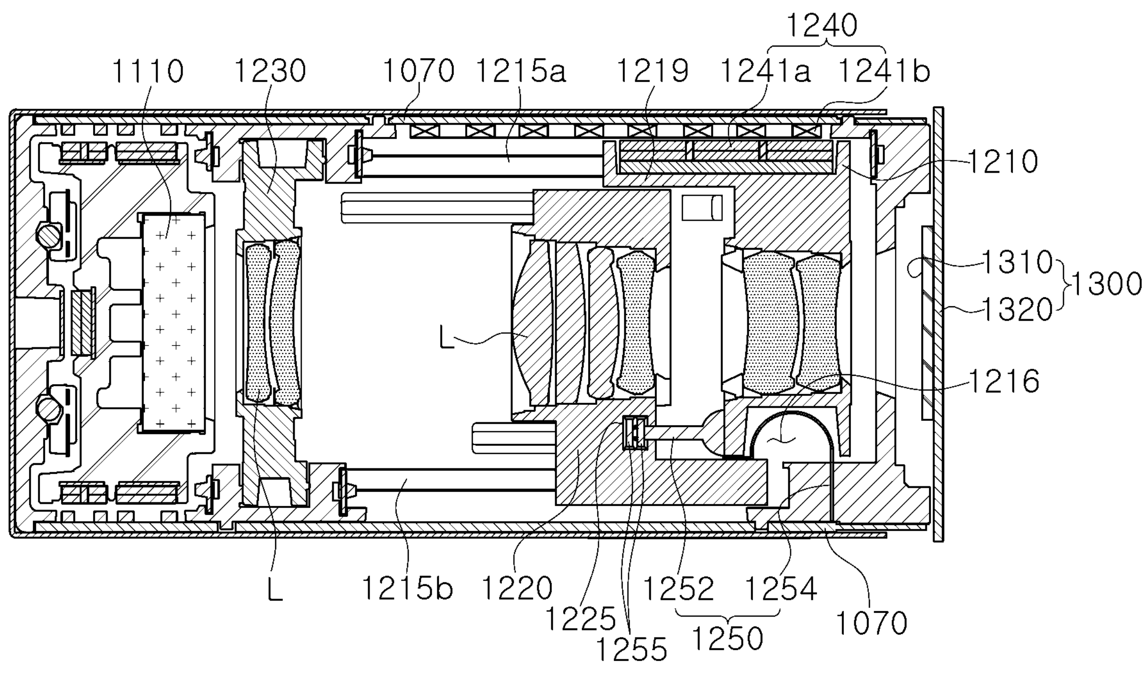
FIG. 4 illustrates a cross-sectional diagram of the example camera module illustrated in FIG. 2.

FIG. 2 is a perspective diagram illustrating an example camera module, in accordance with one or more embodiments. FIG. 3 is an exploded perspective diagram illustrating a portion of the camera module illustrated in FIG. 2. FIG. 4 is a cross-sectional diagram illustrating the camera module illustrated in FIG. 2.

Referring to FIGS. 2 to 4, the camera module 1000 in an example may include a housing 1010, a reflection module 1100, a lens module 1200, and an image sensor module 1300.

The housing 1010 may have an internal space in which the reflection module 1100, the lens module 1200, and the image sensor module 1300 may be accommodated.

In an example, as illustrated in FIG. 3, the housing 1010 may be provided in an integrated form such that both the reflection module 1100 and the lens module 1200 may be accommodated in the internal space. However, an example thereof is not limited thereto, and separate housings accommodating the reflective module 1100 and the lens module 1200 may be connected to each other.

The housing 1010 may include a first housing **1010*a* and a second housing 1010*b*** which are configured to be coupled to each other.

The second housing **1010*b* may include an opening 1031 (FIG. 2) through which light is incident, and a traveling direction of light incident through the opening 1031 may change and light may be incident to the lens module 1200 via the reflection module 1100. The second housing 1010*b* may be provided in an integrated form to cover the entire first housing 1010*a*, or may be provided as separate members covering the reflection module 1100 and the lens module 1200**, respectively.

The reflection module 1100 may be disposed in the housing 1010, and may change a traveling direction of light. In an example, a travelling direction of light incident in the thickness direction (Y-axis direction) of the camera module 1000 through the opening 1031 of the camera module 1000 may change in the length direction (Z-axis) of the camera module 1000. Accordingly, the reflection module 1100 may include an optical path changing member 1110 such as a mirror, a prism, and a beam splitter.

The image sensor module 1300 may include an image sensor 1310 that converts light passing through a plurality of lenses into electrical signals, and a circuit board 1320 on which the image sensor 1310 is mounted. The image sensor module 1300 may include an optical filter that filters light incident through the lens module 1200. In a non-limiting example, the optical filter may be implemented as an infrared cut-off filter.

In the internal space of the housing 1010, the reflection module 1100 may be provided on the incident side of the light centered on the lens module 1200, and the image sensor module 1300 may be provided on an opposing side.

The lens module 1200 may include a plurality of lenses L through which incident light of which a traveling direction may have been changed by the reflection module 1100, may pass. Additionally, the lens module 1200 may perform autofocus (AF) and zoom functions while moving along the optical axis direction (Z axis) of at least one of the plurality of lenses.

The lens module 1200 may include a plurality of lens barrels 1210, 1220, and 1230. In an example, three lens barrels may be provided. However, this is only an example, and the number of lens barrels may be one or more.

In the camera module 1000, autofocus (AF) and zoom functions may be implemented as at least one of the plurality of lens barrels 1210, 1220, and 1230 moves in the optical axis direction (Z axis).

In the example, three lens barrels 1210, 1220, and 1230 may move in the optical axis direction, or the lens barrel 1230, among the lens barrels, may be fixed so as to not move in the optical axis direction, and autofocus (AF) and zoom functions may be implemented by the moving lens barrels 1210 and 1220.

In the example, with respect to the traveling direction of light, the rear two lens barrels 1210 and 1220 may be responsible for a zoom function, and the front lens barrel 1230 may be responsible for an autofocus function. However, an example is not limited thereto, and the three lens barrels 1210, 1220, and 1230 may perform a zoom function and an autofocus function in a divided manner or in an overlapping manner by various combinations thereof.

In the lens module 1200 in the example, the first lens barrel 1210 and the second lens barrel 1220 may be arranged to move in the optical axis (Z axis) direction in the internal space of the housing 1010.

The first lens barrel 1210 may move in the optical axis (Z-axis) direction based on an operation of the first driving unit 1240. Additionally, the second lens barrel 1220 may be connected to the first lens barrel 1210 and may move together with the first lens barrel 1210 based on the movement of the first lens barrel 1210.

The first and second lens barrels 1210 and 1220 may be provided to be supported by the bottom surface of the housing 1010. In an example, both the respective first and second lens barrels 1210 and 1220 may be individually supported by the bottom surface of the housing 1010 via a ball member or a shaft, and only examples.

In an example, the first lens barrel 1210 may move in the optical axis direction on a first shaft 1215*a* which is fixedly disposed on one side of the bottom surface of the housing 1010 in the optical axis (Z-axis) direction, and a ball member (not illustrated) disposed to move in the optical axis (Z axis) direction on the other side of the bottom surface of the housing 1010. In this example, the first lens barrel 1210 may slide on the first shaft 1215*a*, and may roll on the ball member.

Accordingly, the first shaft 1215*a* and the ball member may be disposed between the first lens barrel 1210 and the housing 1010, and may support the first lens barrel 1210.

The first driving unit 1240 may include a plurality of magnets 1241*a* and a plurality of coils 1241*b* disposed to oppose the plurality of magnets 1241*a* to drive the first lens barrel 1210. In an example, the first driving unit 1240 may be configured to operate based on a voice coil motor (VCM) method implementing electromagnetic coupling between the plurality of magnets 1241*a* and the plurality of coils 1241*b*.

The first lens barrel 1210 in the example may need to move an extended distance in the optical axis direction to implement a zoom camera. Accordingly, each magnet 1241*a* may be implemented as a permanent magnet magnetized with two or more poles to have at least N and S poles in the optical axis direction in sequence.

The plurality of magnets 1241*a* may be mounted on a side surface of the first lens barrel 1210. Additionally, the plurality of coils 1241*b* may be mounted on the housing 1010 to oppose the plurality of magnets 1241*a*, respectively. In an example, the plurality of coils 1241*b* may be mounted on the main board 1070 in a position opposing the magnet 1241*a*, and the main board 1070 may be attached to the housing 1010.

At least a portion of the coil 1241*b* may be disposed to oppose the magnet 1241*a*. Accordingly, when power is applied to the plurality of coils 1241*b*, the first lens barrel 1210 on which the plurality of magnets 1241*a* are mounted may move in the optical axis (Z axis) direction based on electromagnetic influence between the plurality of magnets 1241*a* and the plurality of coils 1241*b*. Accordingly, zooming or autofocusing may be implemented.

In an example, the main board 1070, on which the plurality of coils 1241*b* are mounted, may be configured as a flexible circuit board (e.g., FPCB). However, the example is not limited thereto. The main board 1070 may be disposed along an external or internal surface of the housing, and may be electrically connected to the plurality of coils 1241*b* mounted on one surface thereof.

A portion of the first lens barrel 1210 on which the magnet 1241*a* is mounted may include an extension portion 1219 that extends toward the second lens barrel 1220. In this example, the number of magnets mounted on the first lens barrel 1210 may be increased, such that driving force of the first lens barrel 1210 may increase.

The second lens barrel 1220 may be provided in the housing 1010 to move in the optical axis (Z axis) direction. The second lens barrel 1220 may be disposed on a front side of the first lens barrel 1210, and an optical axis thereof may be disposed to coincide with an optical axis of the first lens barrel 1210.

The second lens barrel 1220 may be provided in the housing 1010 to move in the optical axis (Z axis) direction based on an operation of the second driving unit 1250. Accordingly, a shaft 1215*b* and a ball member (not illustrated) may also be provided between the second lens barrel 1220 and the bottom surface of the housing 1010.

The second driving unit 1250 may adjust a spacing distance between the first lens barrel 1210 and the second lens barrel 1220. Accordingly, the second driving unit 1250 may be connected to each of the first lens barrel 1210 and the second lens barrel 1220 and may change a distance therebetween.

The second driving unit 1250 in the example may include a variable member, or linear actuator, 1252 and a connection board 1254.

The connection board 1254 may have a first end connected to the variable member 1252 and a second end connected to a main board 1070, and may electrically connect the variable member 1252 to the main board 1070, and may apply a current to the variable member 1252.

The connection board 1254 may be configured as a circuit board having flexible properties. In an example, the connection board 1254 may be formed by forming a wiring pattern on an insulating film having flexibility. The insulating film may be formed of a material such as, but not limited to, polyimide (PI), polyester (PET), or glass epoxy, but an example thereof is not limited thereto.

One end of a circuit board of the connection board 1254 may have a fixed position with respect to the housing, and the other end may have a fixed position with respect to the first lens barrel. Accordingly, when the first lens barrel 1210 moves, the other end of the connection board 1254 may move together with the first lens barrel 1210 and may maintain an electrical connection with the variable member 1252.

A length of the connection board 1254 may be configured to be greater than the distance by which the first lens barrel 1210 moves. Accordingly, as illustrated in FIG. 4, when the first lens barrel 1210 is disposed toward the image sensor 1310, the connection board 1254 may be bent and may protrude toward the first lens barrel 1210. Accordingly, the first lens barrel 1210 may include a receiving groove 1216 in which the connection board 1254 is partially accommodated. A portion of the connection board 1254 which is bent and protrudes toward the first lens barrel 1210 may be accommodated in the receiving groove 1216.

The variable member 1252 may change a distance between the first lens barrel 1210 and the second lens barrel 1220 based on a signal transmitted from the main board 1070. Accordingly, the variable member 1252 may be formed in a rod shape having a predetermined length, and one end thereof may be coupled to the first lens barrel 1210, and the other end may be coupled to the second lens barrel 1220.

In the example, the variable member 1252 may include a linear actuator of which a length in the optical axis direction changes based on a current, and may include, for example, a piezo linear actuator. Accordingly, when an electric signal is transmitted to the variable member 1252, the distance between the ends of the variable member 1252 may extend or may be reduced. Accordingly, the distance between the first lens barrel 1210 and the second lens barrel 1220 may change.

As described above, the second lens barrel 1220 may be configured to move only in the optical axis direction along the length direction of the shaft 1215*b*. To correspond to this configuration, the variable member 1252 may be disposed such that a length direction thereof may be parallel to the optical axis, and both ends thereof may be fastened to the first lens barrel 1210 and the second lens barrel 1220, respectively.

Both ends of the variable member 1252 may be fixedly fastened respectively to the first and second lens barrels 1210 and 1220 through a fastening member such as an adhesive member or a bolt. However, the examples are not limited thereto. In an example, at least a portion of the variable member 1252 may be inserted into, and coupled to, the first and second lens barrels 1210 and 1220.

In the example, a first end of the variable member 1252 may be coupled to one surface of the first lens barrel 1210 that opposes the second lens barrel 1220. A second end of the variable member 1252 may be inserted into, and coupled to, the second lens barrel 1220. Accordingly, an extension portion 1255 of the variable member 1252 that protrudes in a direction orthogonal to the length direction of the variable member 1252 may be provided on the second end of the variable member 1252, and an insertion groove 1225 to which the extension portion 1255 is inserted may be formed in the second lens barrel 1220.

The insertion groove 1225 may be formed in a shape corresponding to one end of the variable member 1252 in which the extension portion 1255 is formed. Additionally, in the example, the lens module 1200 may move toward the bottom surface of the first housing 1010*a* on the first housing 1010*a* and may be disposed in the first housing 1010*a*. Additionally, the insertion groove 1225 may be formed as a groove having a depth in a direction orthogonal to the moving direction of the second lens barrel 1220.

Accordingly, the variable member 1252 coupled to the first lens barrel 1210 may be inserted into the insertion groove 1225 of the second lens barrel 1220 while the first lens barrel 1210 is mounted on the first housing 1010*a*.

Thereafter, an operation of the camera module 1000, in accordance with one or more embodiments, will be described.

Figure 5:
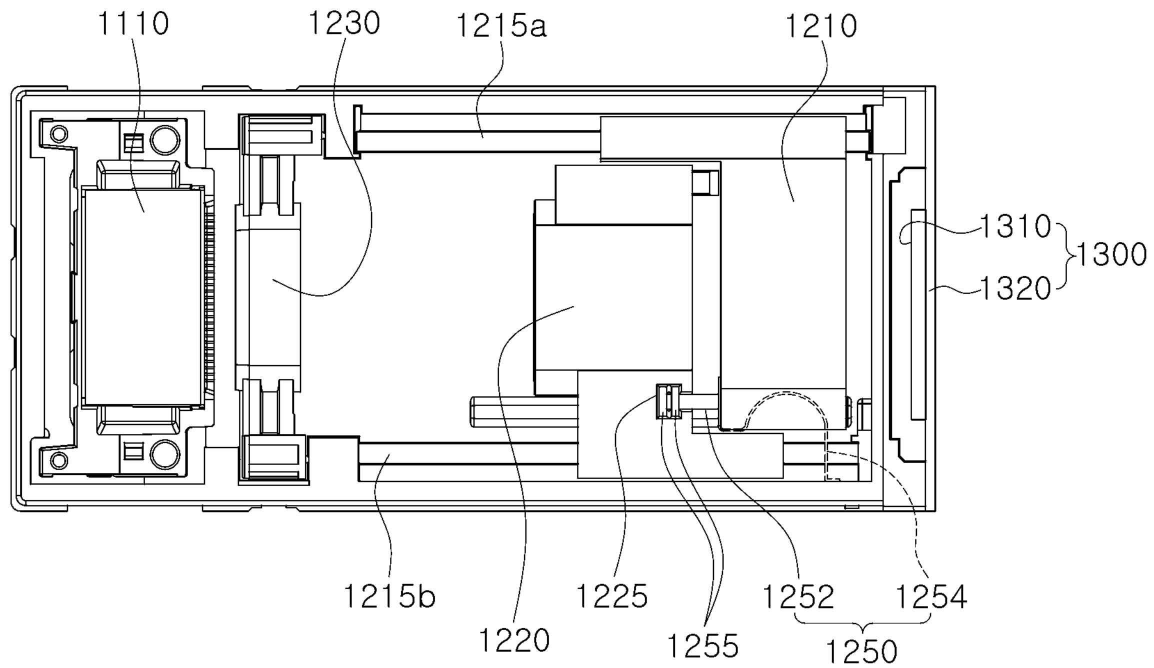
FIGS. 5 to 7 illustrate diagrams of the example camera module illustrated in FIG. 4.
Figure 6:
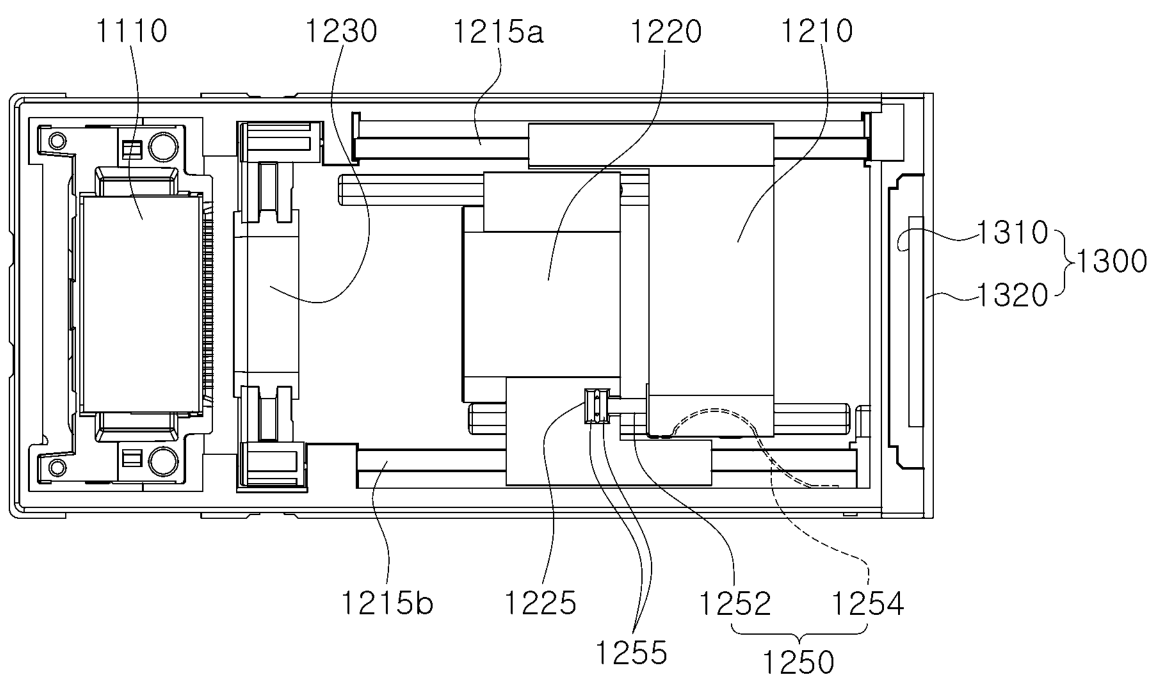
Figure 7:
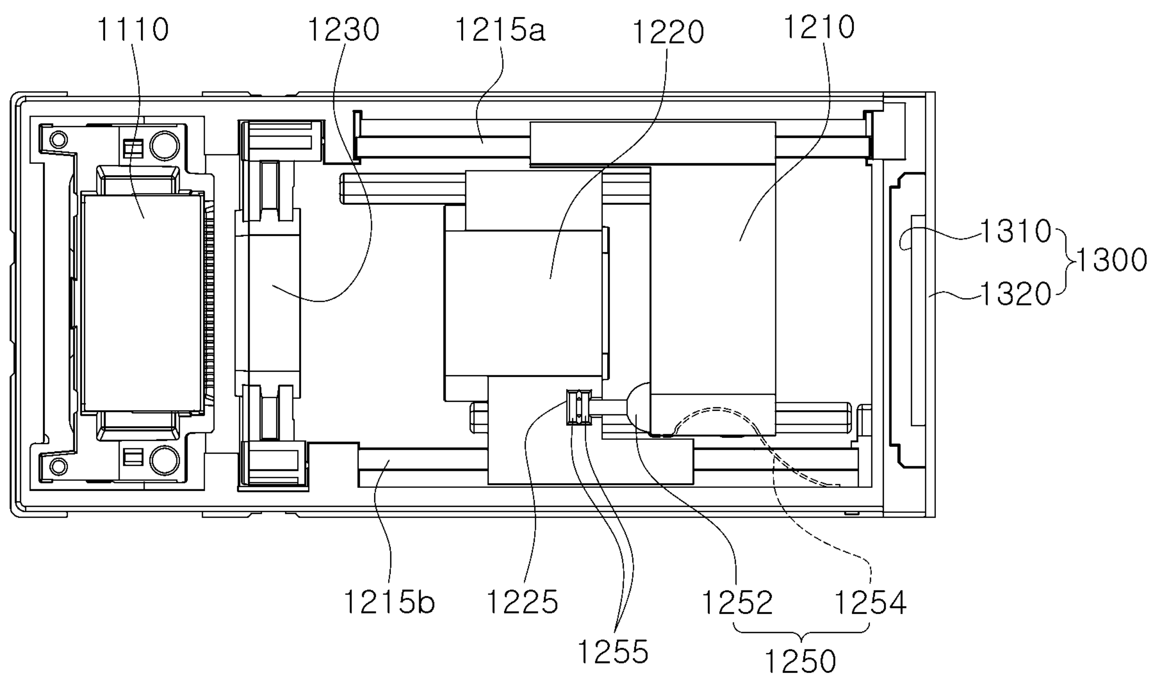

FIGS. 5 to 7 are diagrams illustrating the camera module illustrated in FIG. 4.

Referring to FIG. 5, in the example camera module 1000, a state in which both the first lens barrel 1210 and the second lens barrel 1220 have been moved to the image sensor 1310 side is illustrated. As described above, the first lens barrel 1210 and the second lens barrel 1220 may be connected to each other by the variable member 1252. Accordingly, the first lens barrel 1210 and the second lens barrel 1220 may not be spaced apart from each other by a distance that is greater than the length of the variable member 1252.

As illustrated in FIG. 6, an operation of moving the first lens barrel 1210 based on an operation of the first driving unit 1240, may be performed. In this example, since the second lens barrel 1220 may be connected to the first lens barrel 1210 based on the variable member 1252, when the first lens barrel 1210 moves, the second lens barrel 1220 may also move. In this process, the distance between the first lens barrel 1210 and the second lens barrel 1220 may be maintained to be constant based on the connection of the variable member 1252.

When the first lens barrel 1210 moves to a specific position, an operation of moving the second lens barrel 1220 to a specific position may be performed.

As illustrated in FIG. 7, in this operation, the movement of the second lens barrel 1220 may be performed based on an operation of the second driving unit 1250. The second driving unit 1250 may change the distance between the first lens barrel 1210 and the second lens barrel 1220 by increasing or decreasing the length of the variable member 1252.

Since the movement of the first lens barrel 1210 is fixed based on an operation of the first driving unit 1240, when the length of the variable member 1252 changes, the position of the second lens barrel 1220 may change.

The operations described above may be performed in sequence or simultaneously. For example, the first driving unit 1240 may operate and may move the first lens barrel 1210 and the second lens barrel 1220, and the second driving unit 1250 may operate and may determine a final position of the second lens barrel 1220. Alternatively, conversely, the second driving unit 1250 may operate, and the first driving unit 1240 may operate thereafter, or alternatively, the first driving unit 1240 and the second driving unit 1250 may operate simultaneously such that the first lens barrel 1210 and the second lens barrel 1220 may move together and the distance may be adjusted.

In the camera module 1000 configured as described above in the example, the first lens barrel 1210 and the second lens barrel 1220 may move together through the first driving unit 1240. Accordingly, only a single driving unit of a voice coil motor (VCM) method using electromagnetic coupling between a coil and a magnet may be provided. In the example of the voice coil motor method, the volume occupied by the driving unit in the camera module 1000 may be relatively large. Accordingly, when the driving unit of a voice coil motor method that drives the second lens barrel 1220 is not provided as in the example, the size of the camera module 1000 may be reduced.

Additionally, consumption of power supplied to the driving unit may be reduced as compared to the example in which two driving units of a voice coil motor method operate.

The example is not limited to the aforementioned example and various modifications may be made.

Figure 8:
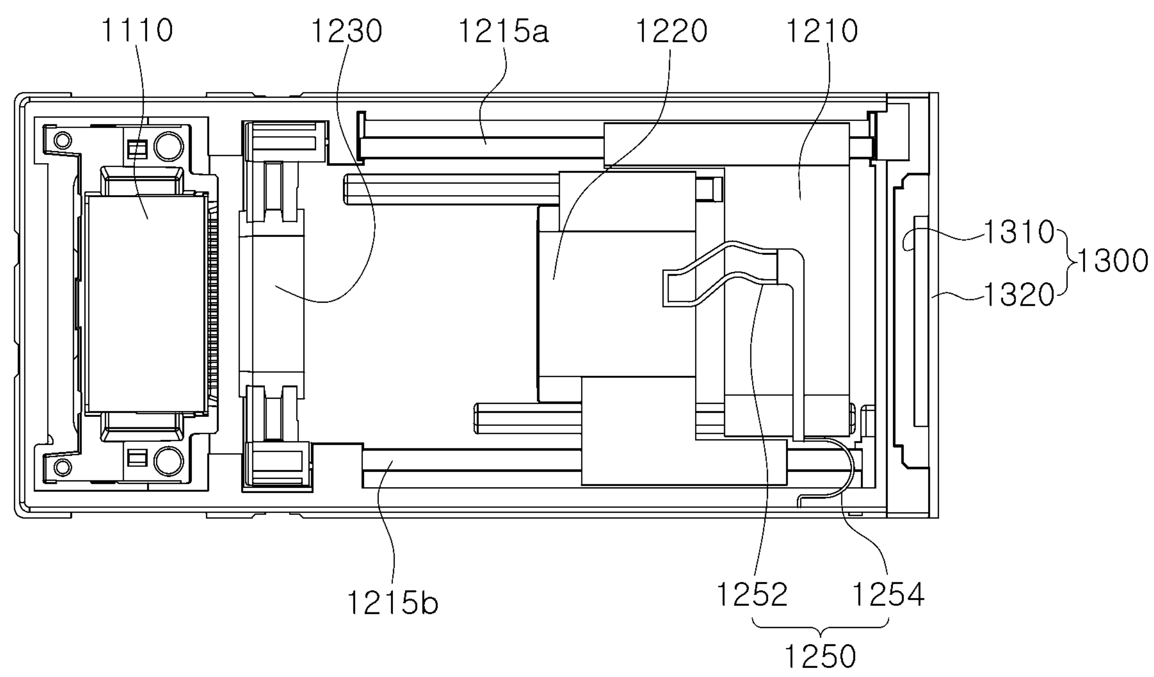
FIGS. 8 to 10 are diagrams illustrating operations of an example camera module, in accordance with one or more embodiments.
Figure 9:
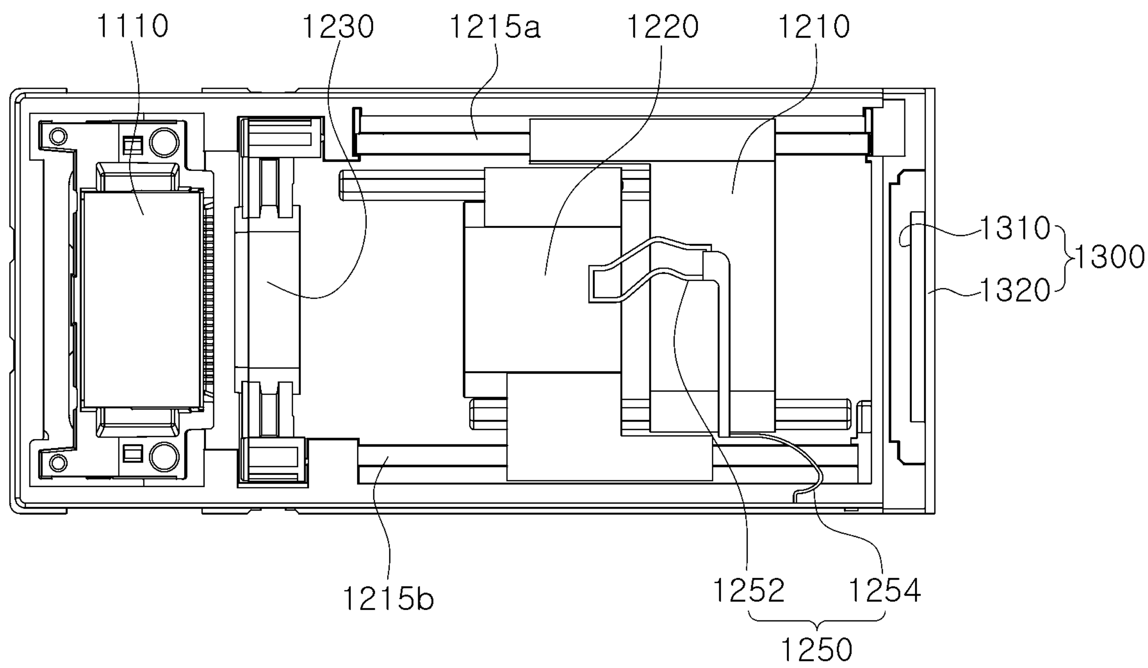
Figure 10:
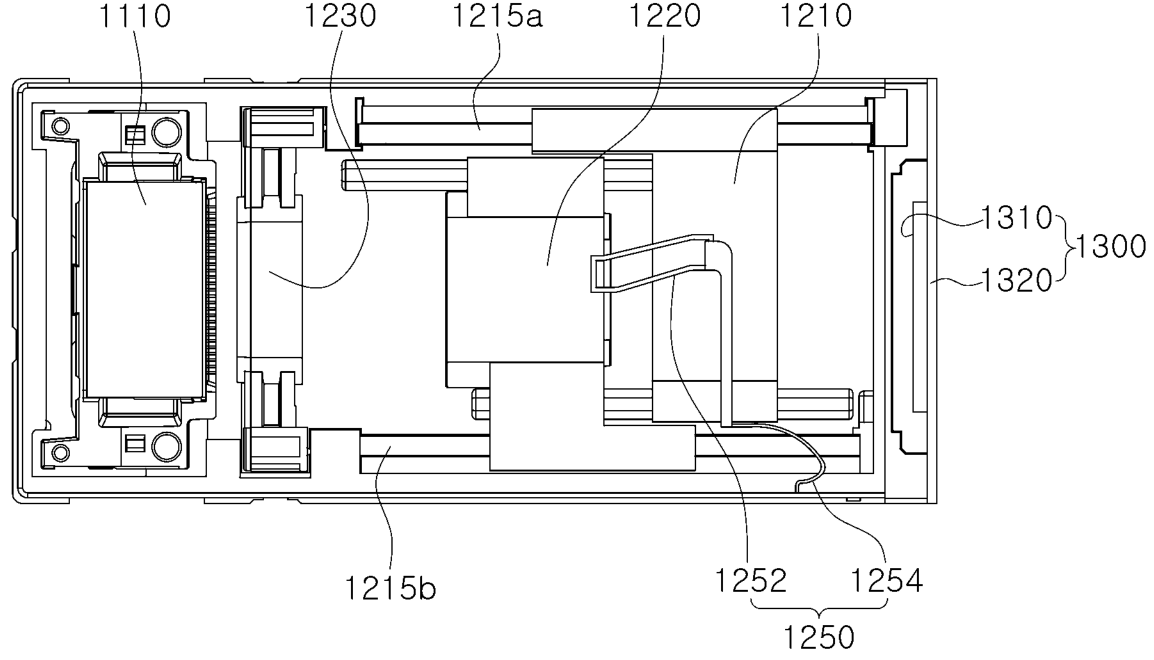

FIGS. 8 to 10 are diagrams illustrating operations of an example camera module, in accordance with one or more embodiments. In the example camera module 1000 illustrated in FIGS. 8 to 10, the variable member 1252 may be configured as a different type of actuator differently from the camera module 1000 described in FIGS. 1 to 7 in the aforementioned example, and accordingly, in the camera module 1000 according to FIGS. 8 to 10, other configurations other than the variable member 1252 may be the same as in the descriptions in FIGS. 1 to 7.

Referring to FIG. 8, at least a portion of the variable member 1252 included in the second driving unit 1250 of the camera module 1000 in the example may include a shape-memory alloy. In this example, when a current is applied to the variable member 1252, a distance between ends of the variable member 1252 may change to be shortened or elongated, and may be restored to an original state when the supply of current stops.

Accordingly, the variable member 1252 in the example may change the distance between the first lens barrel 1210 and the second lens barrel 1220 by controlling a current using properties of the shape memory alloy.

In an example, a first end of the variable member 1252 may be coupled to an upper surface of the first lens barrel 1210, and a second end of the variable member 1252 may be coupled to an upper surface of the second lens barrel 1220. The variable member 1252 may be electrically connected to the connection board 1254 and may receive a current or voltage from an external entity.

When a current is applied to the shape memory alloy included in the variable member 1252 and the length thereof changes, the distance between the first lens barrel 1210 and the second lens barrel 1210 may change to correspond to the amount of changes in the length of the variable member 1252. Accordingly, both the positions of the first lens barrel 1210 and the second lens barrel 1220 may change based on a movement the first driving unit (e.g., 1240 in FIG. 4) and a movement of the second driving unit. In an example, the position of the first lens barrel 1210 may be adjusted through the first driving unit 1240 (in FIG. 4), and simultaneously, the length of the variable member 1252 may change such that the position of the second lens barrel 1220 may be adjusted.

An operation of the camera module 1000, in accordance with one or more embodiments, will be described in greater detail below.

As illustrated in FIG. 8, in the example camera module 1000, a current may be applied to first driving unit 1240 (in FIG. 4) while the first lens barrel 1210 and the second lens barrel 1220 are on standby.

Accordingly, as illustrated in FIG. 9, the first driving unit 1240 (in FIG. 4) may move the first lens barrel 1210. In this example, since the second lens barrel 1220 may be connected to the first lens barrel 1210 via the variable member 1252, when the first lens barrel 1210 moves based on a driving force of the first driving unit 1240 (in FIG. 4), the second lens barrel 1220 may move together with the first lens barrel 1210.

Thereafter, when the first lens barrel 1210 moves to a specific position, an operation of moving the second lens barrel 1220 to a specific position may be performed.

As illustrated in FIG. 10, the moving of the second lens barrel 1220 may be performed based on an operation of the second driving unit 1250. The second driving unit 1250 may extend or reduce the length of the variable member 1252 by supplying a current to the variable member 1252 or by adjusting the amount of the supplied current. Accordingly, the length of the variable member 1252 may change, such that the distance between the first lens barrel 1210 and the second lens barrel 1220 may change. Accordingly, the position of the second lens barrel 1220 may be determined.

The operations described above may be performed in sequence or simultaneously. In an example, the first driving unit 1240 in FIG. 4 may operate to move the first lens barrel 1210 and the second lens barrel 1220, and the second driving unit 1250 may operate to determine a final position of the second lens barrel 1220. Alternatively, conversely, the second driving unit 1250 may operate, and the first driving unit 1240 (in FIG. 4) may operate thereafter, or alternatively, the first driving unit 1240 (in FIG. 4) and the second driving unit 1250 may operate simultaneously such that the first lens barrel 1210 and the second lens barrel 1220 may together and the distance between the first lens barrel 1210 and the second lens barrel 1220 may be adjusted simultaneously.

According to the aforementioned example embodiments, a size of the lens module and the camera module may be reduced, and power consumption may be reduced as compared to operating two driving units of a voice coil motor method.

Additionally, by moving the plurality of lens barrels consecutively, a continuous zoom function or an autofocus function may be effectively performed.

Additionally, a lens module having a simplified structure and a reduced weight may be provided.

While the examples have been illustrated and described above, it will be apparent to those skilled in the art that modifications and variations could be made without departing from the scope of the examples as defined by the appended claims.

In an example, in the aforementioned examples, the example in which the connection board is directly connected to the variable member has been described. However, the examples are not limited thereto, and the connection board may electrically connect the main substrate to the lens barrel, and a conductive member may electrically connect the connection board and the variable member to the lens barrel. Additionally, the examples may be combined with each other.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:

a first lens barrel;

a second lens barrel;

a first driving unit configured to move the first lens barrel in an optical axis direction; and a second driving unit configured to move the second lens barrel in the optical axis direction, wherein the second driving unit is further configured to be moved in the optical axis direction by the first lens barrel as the first lens barrel is moved in the optical axis direction by the first driving unit, and the second driving unit is directly connected to the first lens barrel and directly connected to the second lens barrel, and is further configured to change a distance between the first lens barrel and the second lens barrel.

2. The lens module of claim 1, wherein the second driving unit comprises:

a variable member having a first end directly connected to the first lens barrel and a second end directly connected to the second lens barrel, and having a length that changes in response to a current applied to the variable member; and a connection board configured to apply the current to the variable member.

3. The lens module of claim 2, wherein the variable member comprises a linear actuator to which the current is applied, and the linear actuator has a length extending in the optical axis direction that changes in response to the current applied to the linear actuator.

4. The lens module of claim 3, wherein the first end of the variable member is directly bonded to the first lens barrel, and the second end of the variable member is directly inserted into an insertion groove formed in the second lens barrel.

5. The lens module of claim 4, wherein the variable member is directly connected to a surface of the first lens barrel facing the second lens barrel.

6. The lens module of claim 4, wherein the variable member further comprises an extension portion protruding from the second end of the variable member in a direction perpendicular to the optical axis direction, and the extension portion is directly inserted into the insertion groove.

7. The lens module of claim 6, wherein the insertion groove has a depth extending in a direction perpendicular to a moving direction of the second lens barrel.

8. The lens module of claim 1, wherein the first driving unit comprises a voice coil motor comprising a coil and a magnet, and the coil and the magnet are configured to move the first lens barrel in the optical axis direction.

9. The lens module of claim 2, wherein the variable member comprises a shape memory alloy having a length that changes in response to the current applied to the variable member.

10. The lens module of claim 2, further comprising a housing in which the first lens barrel and the second lens barrel are disposed, wherein the connection board comprises a flexible circuit board, and a position of a first end of the flexible circuit board is fixed with respect to the housing, and a position of a second end of the flexible circuit board is fixed with respect to the first lens barrel.

11. A camera module comprising:

a reflection module configured to change a traveling direction of light incident onto the reflection module, and emit light having the changed traveling direction;

a lens module to which the light emitted from the reflection module is incident, wherein the lens module comprises:

a first lens barrel configured to move in an optical axis direction;

a second lens barrel facing the first lens barrel in the optical axis direction and configured to move in the optical axis direction; and a variable member having a first end directly fastened to the first lens barrel and a second end directly fastened to the second lens barrel, wherein the variable member is configured to be moved in the optical axis direction by the first lens barrel as the first lens barrel moves in the optical axis direction, and a distance between the first end of the variable member and the second end of the variable member changes in response to a current applied to the variable member.

12. The camera module of claim 11, wherein the variable member comprises a linear actuator to which the current is applied, and the linear actuator has a length extending in the optical axis direction that changes in response to the current applied to the linear actuator.

13. The camera module of claim 11, wherein the variable member comprises a shape memory alloy having a length that changes in response to the current applied to the variable member.

14. The camera module of claim 11, further comprising a connection board connected to the variable member and configured to apply the current to the variable member.

15. The camera module of claim 14, wherein the first lens barrel comprises a receiving groove in which a portion of the connection board is disposed.

16. A camera module comprising:

a first lens barrel configured to move in an optical axis direction in response to being driven by a first driving unit;

a second lens barrel configured to move in the optical axis direction in response to being driven by a second driving unit;

a third lens barrel; and a linear actuator having a first end directly connected to the first lens barrel, and a second end directly connected to the second lens barrel, wherein the linear actuator is configured to be moved in the optical axis direction together by the first lens barrel as the first lens barrel moves in the optical axis direction in response to being driven by the first driving unit, and a length of the linear actuator changes in response to a signal received by the linear actuator.

17. The camera module of claim 16, wherein the linear actuator comprises a shape memory alloy.

18. The camera module of claim 16, wherein the linear actuator is inserted into and directly connected to the second lens barrel.

19. The camera module of claim 16, wherein the second driving unit comprises:

the linear actuator; and a connection board electrically connecting the linear actuator to a main board and configured to receive the signal from the main board and supply the signal to the linear actuator.

* * * * *